Patented Oct. 11, 1938

2,132,511

UNITED STATES PATENT OFFICE

2,132,511

CLEANING COMPOSITION AND METHOD

Winfrid Hentrich, Dusseldorf-Reisholz, and Werner Reuss, Dusseldorf-Benrath, Germany, assignors to Henkel & Cie G. m. b. H., Dusseldorf-Holthausen, Germany, a corporation of Germany No Drawing. Application June 12, 1935, Serial No. 26,238. In Germany June 23, 1934

12 Claims. (Cl. 87—5)

This invention relates to industrial processes employing nitric acid wherein nitrogenous gases or nitrous gases are liberated which are harmful to the operators of such processes. It may also be considered as relating to a method of preventing the liberation of harmful nitrous gases from nitric acid during use, and as relating to compositions containing nitric acid and a substance to prevent liberation of harmful gases.

Nitric acid is employed in very large quantities in many commercial processes, but its use involves considerable danger because the evolution of harmful gases occurs when the acid is brought into contact with reducing substances. These gases do considerable harm to those persons coming in contact with the same although the gases may be present in a very small concentration, frequently the damage done being observable only after the passage of several hours. Many serious injuries and frequently cases of death are reported in the literature of the medical profession. Although the dangers involved in the use of nitric acid are well known, the use of such acid cannot be avoided, for it alone combines in an ideal way the qualities of a strong acid and a good oxidizing agent.

The object of the present invention is to make the use of nitric acid in industrial processes a safe operation free of hazards heretofore encountered.

In accordance with the present invention a method has been discovered whereby nitric acid compositions may be produced which possess the valuable qualities of nitric acid in undiminished strength, which products eliminate completely the danger heretofore resulting from the formation of harmful nitrous gases. The compounds which accomplish this beneficial result may be referred to collectively as organic compounds containing a —NH₂ group which may be present either in the free or neutralized state as hereinafter more fully described.

These mixtures of substances comprising the present invention may be used to a considerable advantage in most all commercial processes wherein the use of nitric acid is valuable and wherein the use of such results in the formation of harmful nitrous gases owing to the reduction of the acid by the presence of various organic or inorganic substances. Materials of the most varied chemical composition have the reducing effect upon the nitric acid, for example, conglomerated masses produced by contamination or pollution, and inorganic substances, for example, metals and low metal oxides. The substances which cause the reduction may be present because of the particular technical process in which the nitric acid is employed or the same may be present in the nitric acid accidentally. In either event, the danger from the formation of nitrous gases exists. In accordance with the present invention the organic compound containing the —NH₂ group reacts with the reduction products of the nitric acid and forms harmless substances, for example, nitrogen gas or diazo compounds, the latter being formed when aromatic amines are employed. The organic compounds of the invention may have the —NH₂ group joined directly on a carbon chain or joined on a ring compound. In one embodiment of the invention the organic compound may be an aliphatic, cycloaliphatic, aromatic or a heterocyclic primary amine. Of the aliphatic amines those which possess a straight chain of carbon atoms are most important, such compounds being, for example, methyl amine, ethyl amine, propyl amine, butyl amine, amyl amine, nonyl amine, undecyl amine, dodecyl amine, and the like. In another embodiment amines having a branch chain are employed as for example, isopropyl amine, isobutyl amine, secondary butyl amine, tertiary butyl amine, iso-amyl amine, active amyl amine, 1.1 dimethyl-3-amino butane, di-ethyl carbin amine, di-n-propyl-carbin amine, di-isobutylcarbin amine.

It is not necessary that the above mentioned amines be present in a pure or substantially pure form, for primary amines having a content of secondary or tertiary amines will serve just as well for practical purposes. This fact is of considerable value, for the preparation of pure primary amines on a commercial scale involves considerable difficulties and expense.

Substances with several amino groups, as, e. g., ethylene diamine, propylenediamine, trimethylene diamine and α,γ-trimethyl-trimethylene diamine, can also be used with advantage.

The organic compounds of the present invention may contain other atoms or radicals substituted in their molecules in addition to the —NH₂ group. Thus there may be added to nitric acid, substances of the nature of taurine, amino acids, e. g., glycocoll, alanine, α-amino-n-butyric acid, α-amino-isobutyric acid, valine, leucine, isoleucine, α-amino caprylic acid, α-amino palmitic acid, α-amino stearic acid. Furthermore, amino compounds of polycarboxylic acids may be used with advantage as, for example, aspartic acid and glutamic acid, α-amino adipic acid, α-amino pimelic acid, and derivatives of such compounds, as e. g., asparagine and glutamine; also the amino derivatives of oxy- and oxo compounds, for example, of carbohydrates.

As an additional embodiment of the present invention there may be used aromatic amines such, for example, as the anilines, the toluidines, xylidines, cumidine and mesidine. Additional suitable compounds include mixed aliphatic-aromatic compounds like benzyl amine. Here also, as is true with the other compounds hereindisclosed, substitution products and derivatives are also suitable as, for example, chloraniline. Furthermore, derivatives of polynuclear compounds may be satisfactorily used, such, for example, as the naphthyl amines and the derivatives of anthracene, anthroquinone and phenanthrenes. As examples of the cycloaliphatic amino compounds, cyclohexyl amine and the amino compounds of terpenes, camphors and resins may be mentioned. Heterocyclic amines, like 2-aminothiophene, the β-amino pyrroles, the amino pyridines, the amino piperidines, the amino quinolines, the amino hydroquinolines, the amino isoquinolines, the amino acridines, 3-amido coumaran, 3-amido thionaphthene can be used.

When certain of the aromatic and the heterocyclic compounds above described are employed with nitric acid of high concentration it will be found that not only the nitrous gases are rendered harmless, but also, in some instances, said compounds react with a portion of the nitric acid forming nitro compounds. The compounds of substances which bring about this result are included within the broad field of the invention.

As a further embodiment of the present invention there may be employed compounds in which the —NH₂ radical is joined to an organic acid radical.

Thus acid amides like formamide, acetamide, propionamine, n-butyramide, isobutyramide, n-valeramide, trimethylacetamide, n-capronamide, methyl-n-propyl acetamide, methylisopropyl acetamide, isobutyl acetamide, diethyl acetamide, oenanthic acid amide, n-caprylic acid amide, pelargonic acid amide, n-capric acid amide, lauric acid amide, tridecyl amide, myristic acid amide, palmitic acid amide, and stearic acid amide can be employed. Also there are included amides of polybasic acids, e. g., succinamic acid, succinamide, the amides of aromatic acids like benzoic acidamide, phenylacetic acidamide, the toluic acid amides, hydrocinnamic acid amide, cumic acid amide, salicylic acid amide, mandelic acid amide, vanillic acid amide, phthalic acid amide, amides of acids deriving from indenes, anthracenes, and other polycyclenes. There should be mentioned also the acid amides of cycloaliphatic acids, especially of the acids which are derived from terpenes, camphors and natural resins. As substitutes of heterocyclic amides, there may be mentioned for example, the amides of pyrrol carboxylic acids, furancarboxylic acids, thiophenecarboxylic acids.

In an additional embodiment of the invention the —NH₂ group may be joined on other acid radicals such as in sulfonamides. The sulfonamides may possess the same groups as hereinbefore described in connection with the amines and the organic acid amides. As examples of such compounds, it appears sufficient to refer to benzene sulfonamide and toluene sulfonamide.

In still another embodiment of the invention amides which may be considered as derived from carbonic acid are employed, such compounds including urea, guanidine, hydantoic acid, allophanic acid, biuret and creatine.

Derivatives of the above described compounds may also be used and as well salts of such compounds, as, for example, the acid reacting salts of amides derived from carbonic acid and molecular addition compounds, as, for example, the double bond $CO(NH_2)_2 + NaCl + H_2O$.

Those organic substances which upon reacting with the reduction products of the nitric acid yield diazo compounds, or by evolution of nitrogen yield compounds containing hydroxyl groups, are considered equivalents of the primary amines hereinbefore described and are included within the present invention. For example, compounds like nitroso-diphenyl amine are employed.

It should be understood that the organic compounds hereinbefore disclosed may be used singly or in combination with one or more of such compounds, for all of such mixtures effectively prevent the escape of nitrous gases during the use of nitric acid.

The quantity of the organic compound containing the —NH₂ group to be added to the nitric acid depends upon the extent to which a reduction of the nitric acid or the amount of nitrogenous gases which under ordinary circumstances would be liberated. Naturally if only a small quantity of the nitrous gases would be formed only a small amount of the organic compound would be needed, whereas, if the nitrous gases are expected to appear in larger quantities, or if it is desired to be on the safe side, the organic compounds should be added in a quantity equivalent to the nitric acid, or in an amount in slight excess. The organic compound may be added to the nitric acid prior to its application or during its application.

Although many advantages follow from the use of liquid organic substances in conjunction with nitric acid, solid substances may also be used, for if such solid or insoluble substances are employed they may be brought into action satisfactorily by being dispersed throughout the nitric acid either with or without the addition of dispersing agents.

The present invention also includes all compositions which contain in addition to the nitric acid and organic compound other substances designed to impart some particular property. For example, there may be added wetting agents adapted to increase penetration of the acid into the surfaces treated, such agents being those which are stable towards the nitric acid, for example, the sulfoacids of alkylated aromatic compounds, for example, alkylated naphthalene sulfoacids and alkylated tetrahydronaphthalene sulfoacids. For example, there may be added isopropylnaphthalene sulfoacid.

For many purposes for which the compositions of the present invention are adapted, it is advantageous to employ the same in the form of a paste. This paste may be formed with considerable success by employing merely an aqueous solution of salts or addition products of the herein mentioned organic amine or amide compounds. Those substances which find use primarily in such compositions comprise the acid reacting salts and addition products of amino derivatives of carbonic acid.

Furthermore, very satisfactory pastes can be formed by mixing the compositions with suitable thickening agents, in particular inorganic substances such as infusorial earth and diatomaceous earth. Furthermore, other neutral or acid reaction substances, for example, salts like potassium sulfate, may be added.

The effectiveness of the compounds comprising the present invention appears independent of the surrounding temperature, for the liberation of nitrous gases is effectively prevented at all temperatures normally encountered. The percentage of amine or amide compound employed appears to be somewhat dependent upon the temperature and also upon the particular conditions encountered in the cleaning or other process at hand.

Where the substances which cause the reduction of the nitric acid are present in a very small quantity or are accidentally introduced, the organic compound need be present only in a very small amount. Also a small amount of the compound is sufficient to maintain stabilization during transportation. The present invention is particularly valuable in those industries which can be said to be dependent upon nitric acid as a cleansing agent for satisfactory operation. In the food industry the present compounds are particularly valuable for removing deposits from storage tanks and other apparatus. Encrustations as, for example, beer scale and milk scale, and deposits formed in evaporation apparatus used in the sugar industry, react with nitric acid applied for dissolving the same, and as heretofore practiced evolved harmful nitrous gases. According to the present invention, these gases are made harmless by adding to the nitric acid a suitable quantity of an organic substance containing a $-NH_2$ group. The reason why nitric acid must be used in removing beer and milk scale is that other cleansing agents more or less fail to work and strong alkali acids corrode the aluminum walls of the containers.

If the process of the present application is accomplished under such conditions that salts combine with the nitric acid, or addition compounds of nitric acid with amido compounds of carbonic acid are used, an additional advantage is obtained in that the products, contrary to the results obtained with free nitric acid, do not cause the skin of the operator to turn yellow. Thereby the composition may be very conveniently handled and under suitable conditions such compositions do not corrode aluminum, tin and similar metals and alloys. With such products the packing, transportation and storage is especially simple.

In processes of the above nature the beer scale or milk scale deposit may be removed directly or caused to swell to such an extent that it can with ease be removed by any mechanical operation. The condition of the scale at the end of the treatment depends somewhat upon the acidity of the product used. In order to prevent a premature flowing off of the solution from the walls of the containers being cleaned, inert thickening agents may be advantageously used, thickening agents of the nature of ground diatomaceous earth and infusorial earth being preferred. The duration of the cleaning process is dependent on the strength of the solution employed and the nature of the deposit on the walls or other parts of the containers or apparatus in which the solution is employed.

Example 1

A paste is made by mixing a 16% aqueous solution of urea nitrate with 40% ground diatomaceous earth and applied to the inner surface of an aluminum storage vat employed in the brewery industry, said surface being covered with a heavy deposit of beer scale. After a reaction period of an hour at ordinary temperature, the walls are brushed down with the aid of water and then rinsed off.

Example 2

The inside of a container used in the brewery industry covered with beer scale is coated with a paste made from 62 parts by weight of 50% nitric acid, 16 parts by weight of urea and 22 parts by weight of infusorial earth. After the paste has been applied for half an hour, the walls are brushed off and rinsed. By such procedure, the beer scale is removed without danger to the operator.

Example 3

Two hundred and fifty parts by weight of taurine are introduced into 630 parts by weight of a 20% solution of nitric acid. Into this mixture 135 parts by weight of diatomaceous earth are added during stirring with the result that a soft plastic composition is obtained. This preparation is very well suited for the removal of beer scale and similar deposits found in the apparatus used in the food industry.

Example 4

Three hundred parts by weight of glycocoll are mixed with 720 parts by weight of a 35% nitric acid solution containing 20 parts by weight of isopropylnaphthalene sulfo-acid. This mixture is then made into a plastic mass by incorporating into the same 180 parts by weight of infusorial earth.

Example 5

A composition is formed by mixing 12 parts by weight of acetamide with 25 parts by weight of 50% nitric acid. This mixture reacts strongly acid and is very well suited for the removal of deposits of the most varied character. The formation of nitrous gases is completely avoided by the presence of the acetamide.

Example 6

Ten parts by weight of a 33% methylamine solution are mixed with 32 parts by weight of a 25% nitric acid solution during cooling. A solution is obtained which is strongly acidic and suitable for the most varied cleaning purposes.

Example 7

During cooling, 20 parts by weight of benzene sulfo-amide are mixed with 45 parts by weight of a 30% solution of nitric acid. The product obtained possessing strong acid properties finds employment in processes similar to those for which the product of Example 6 is suitable.

It should be understood that the present invention is not limited to the specific disclosure hereinbefore given, but that it extends to all compounds coming within the general tenor of the disclosure and the scope of the appended claims.

We claim:

1. The method of cleaning organic deposits from apparatus used in the food industries and the like with nitric acid and preventing the liberation of harmful nitrogenous gases from the acid, which comprises admixing an organic compound containing a $-NH_2$ group with a nitric acid cleaning material in an amount sufficient to react with nitrogenous gases which otherwise would be liberated from the acid and applying the resulting composition to deposits to be removed from the apparatus.

2. The method of cleaning organic deposits from apparatus used in the food industries and the like with nitric acid and preventing the liberation of harmful nitrogenous gases from the acid, which comprises admixing a primary amine compound selected from the group consisting of aliphatic, cyclo-aliphatic, aromatic and heterocyclic amines, and their salts, addition products and derivatives with a nitric acid cleaning material in an amount sufficient to react with nitrogenous gases which otherwise would be liberated from the acid and applying the resulting composition to deposits to be removed from the apparatus.

3. The method of cleaning organic deposits from apparatus used in the food industries and the like with nitric acid and preventing the liberation of harmful nitrogenous gases from the acid, which comprises admixing a primary amide compounding selected from the group consisting of aliphatic, cyclo-aliphatic, aromatic and heterocyclic acid amides, and their salts, addition products and derivatives with a nitric acid cleaning material in an amount sufficient to react with nitrogenous gases which otherwise would be liberated from the acid and applying the resulting composition to deposits to be removed from the apparatus.

4. The method described in claim 1 wherein the organic compound containing the —NH$_2$ group is an amido compound of carbonic acid.

5. The method described in claim 3 wherein the amide compound is a sulfonamide.

6. The method described in claim 1 wherein the mixture of compounds is applied in the form of a paste adapted to hold the mixture in contact with the surfaces being treated.

7. The method described in claim 1 wherein the compound containing the —NH$_2$ group is insoluble in water and is maintained dispersed throughout the nitric acid composition by means of a dispersing agent.

8. The method described in claim 1 wherein the mixture of compounds contains also a wetting agent adapted to assist the penetration of the nitric acid into the surface treated.

9. The method described in claim 1 wherein the mixture of compounds contains also an inert thickening agent.

10. A nitric acid composition for the removal of deposits from surfaces without liberating harmful nitrogenous gases comprising nitric acid and a primary amide, said amide being present in an amount sufficient to react with nitrogenous gases which otherwise would be liberated from the acid.

11. The method of treating nitric acid to prevent the liberation of harmful nitrogenous gases when said acid is handled which comprises adding to the acid a sulfur free acid amide, said amide being added in an amount sufficient to react with nitrogenous gases which otherwise would be liberated from the acid.

12. A nitric acid composition which does not liberate harmful nitrogenous gases containing nitric acid and a sulfur free acid amide, said amide being present in an amount sufficient to react with nitrogenous gases which otherwise would be liberated from the acid.

WINFRID HENTRICH.
WERNER REUSS.